US012268647B1

(12) United States Patent
Wang et al.

(10) Patent No.: US 12,268,647 B1
(45) Date of Patent: Apr. 8, 2025

(54) SEXUAL STIMULATION DEVICE

(71) Applicant: Junpeng Wu, Shenzhen (CN)

(72) Inventors: Qinling Wang, Guangdong (CN); Junpeng Wu, Shenzhen (CN); Qinduo Wang, Guangdong (CN)

(73) Assignee: Junpeng Wu, Shenzhen (CN)

( * ) Notice: Subject to any disclaimer, the term of this patent is extended or adjusted under 35 U.S.C. 154(b) by 0 days.

(21) Appl. No.: 18/672,087

(22) Filed: May 23, 2024

(30) Foreign Application Priority Data

Feb. 6, 2024 (CN) ......................... 202420286920.3
Apr. 19, 2024 (CN) ......................... 202420835748.2

(51) Int. Cl.
*A61H 19/00* (2006.01)

(52) U.S. Cl.
CPC ..... *A61H 19/44* (2013.01); *A61H 2201/1215* (2013.01)

(58) Field of Classification Search
CPC ............ A61H 19/44; A61H 2201/1215; A61H 7/007; A61H 7/005; A61H 2007/009; A61H 19/34; A61H 19/40; A61H 21/00
See application file for complete search history.

(56) References Cited

U.S. PATENT DOCUMENTS 11,771,619 B1 * 10/2023 Yan ........................ A61H 19/34 600/38
2013/0281776 A1 * 10/2013 Levy ...................... A61H 23/02 600/38
2016/0045392 A1 * 2/2016 Massey .................. A61H 19/00 601/46

FOREIGN PATENT DOCUMENTS

GB 2045616 A * 11/1980 ............. A61H 19/44

* cited by examiner

*Primary Examiner* — Kendra D Carter
*Assistant Examiner* — Arielle Wolff

(57) ABSTRACT

A sexual stimulation device includes a shell, a first driving unit and a second driving unit. The shell includes a massage portion formed at one end thereof, wherein the massage portion is configured to be inserted into a rectum or a vagina of a human body. An outer surface of the massage portion serves as a massage surface of the sexual stimulation device for contacting a rectum wall or a vaginal wall. The first driving unit includes a vibration motor arranged in the massage portion; and the second driving unit includes a gearbox and a swing arm driven by the gearbox. One end of the swing arm is connected to the massage portion, and under the driving of the second driving unit, the massage portion moves along an annular trajectory to make the massage surface form a kneading effect on the rectum wall or the vaginal wall.

18 Claims, 8 Drawing Sheets

SEXUAL STIMULATION DEVICE

CROSS-REFERENCE TO RELATED APPLICATIONS

The present application claims priorities to Chinese Patent Application No. 202420286920.3, filed on Feb. 6, 2024, and Chinese Patent Application No. 202420835748.2, filed on Apr. 19, 2024, the entire contents of which are hereby incorporated by reference.

TECHNICAL FIELD

The present application relates to the technical field of sex toys, and in particular to a sexual stimulation device.

BACKGROUND

With the improvement of the human living, in addition to material aspects, more spiritual needs are being pursued. Sexual life has gained more and more attention as a spice of human life, and varied sex toys are developed to add pleasures to sexual life, which satisfy human physiological and psychological needs to a certain extent.

Generally, a sex toy includes a massage head and a motor driving the massage head to do linear reciprocating motion, thereby providing stimulation to a sensitive area of the human body, such as the clitoris, the vagina and the like. However, such sex toy stimulates the human body has a limited stimulation range and unsatisfactory stimulation effect.

SUMMARY

An object of this application is to provide a sexual stimulation device, which has an enlarged stimulation range and better stimulation effect.

To achieve the above object, this application provides a sexual stimulation device that includes:

- a shell including a massage portion formed at one end thereof, the massage portion being configured to be inserted into a rectum or a vagina of a human body, an outer surface of the massage portion serving as a massage surface of the sexual stimulation device for contacting a rectum wall or a vaginal wall;
- a first driving unit including a vibration motor arranged in the massage portion; and
- a second driving unit including a gearbox and a swing arm driven by the gearbox, one end of the swing arm being connected to the massage portion, under the driving of the second driving unit, the massage portion moving along an annular trajectory to make the massage surface form a kneading effect on the rectum wall or the vaginal wall.

Compared with the prior art, the present application has the following beneficial effects: there are two driving units for driving the massage portion to move in two different manners, wherein one of the driving units drives the massage portion to move along an annular trajectory to knead the vagina or the rectum of the human body, which not only provides a more comfortable sexual experience, but also enlarges a stimulation area of this sexual stimulation device. Accordingly, a stimulation effect is better, and thus the users are more likely to reach orgasm with the help of the present sexual stimulation device.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

Figure 1:
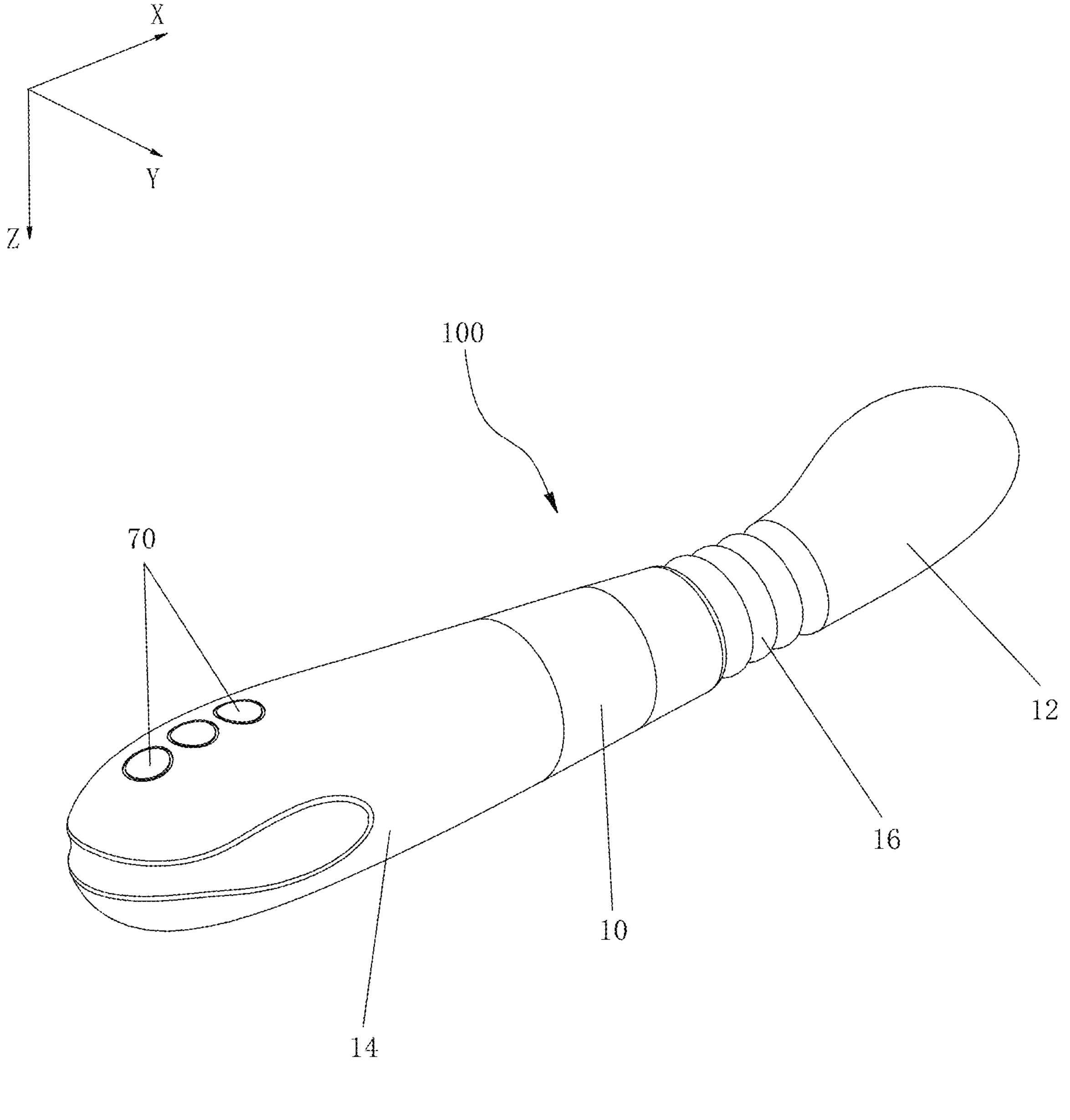
FIG. 1 is a schematic, assembled view of a sexual stimulation device according to an embodiment of the present application.
Figure 2:
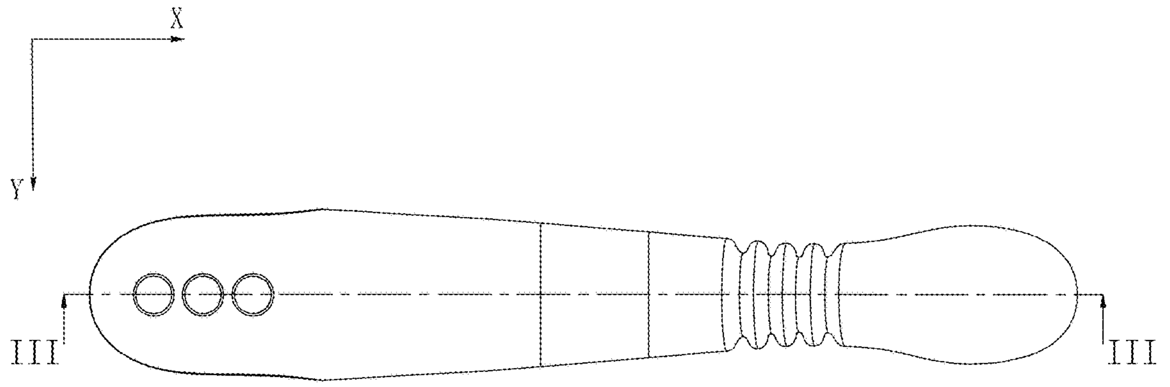
FIG. 2 is a top plan view of the sexual stimulation device of FIG. 1.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIGS. 1-4, a sexual stimulation device according to an embodiment of the present application is shown. In this embodiment, the sexual stimulation device 100 includes a shell 10, and a first driving unit 20 and a second driving unit 30 mounted in the shell 10.

In this embodiment, the shell 10 is generally elongated and rod-shaped, with one end being provided with a massage portion 12 and another end serving as a handle 14. During use, the user holds the handle 14 and inserts the massage portion 12 into his/her body, such as inserts into the vagina, the rectum, and etc., An outer surface of the massage portion 12 serves as the massage surface of the sexual stimulation device 100 and comes into direct contact with the human body, such as the vaginal wall, the rectum wall, and etc. In the embodiment shown in FIG. 1, the massage surface of the massage portion 12 is a smooth, convex surface that can form good surface contact with the human body. In some embodiments, the massage surface may have protrusions, patterns, etc. formed thereon to enhance the stimulation effect.

Figure 3:
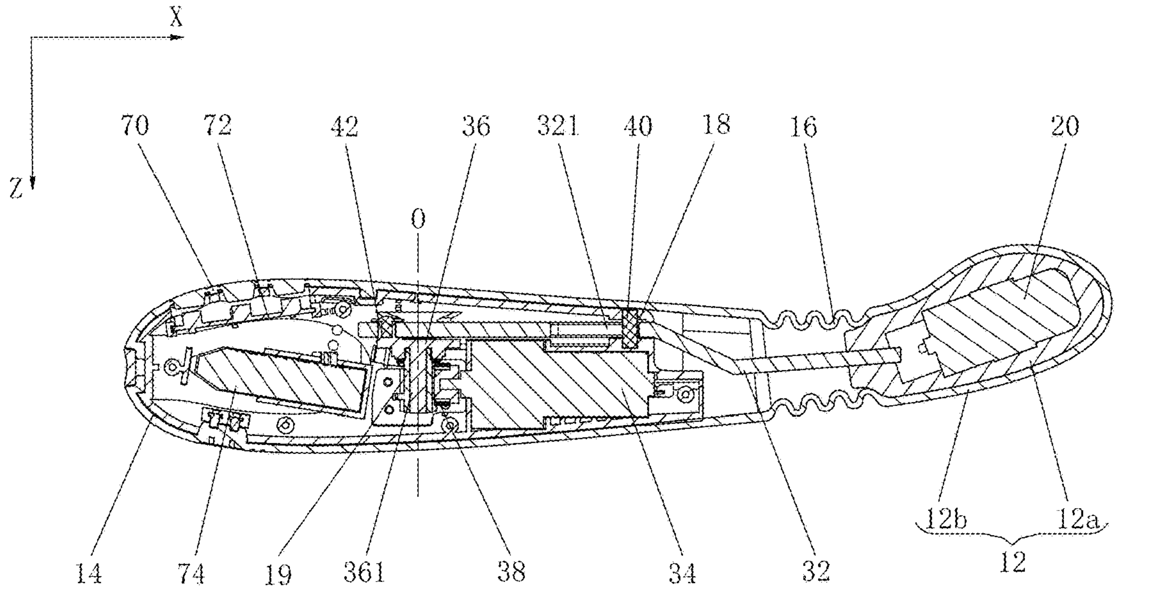
FIG. 3 is a cross sectional view of the sexual stimulation device taken along line III-III of FIG. 2.
Figure 4:
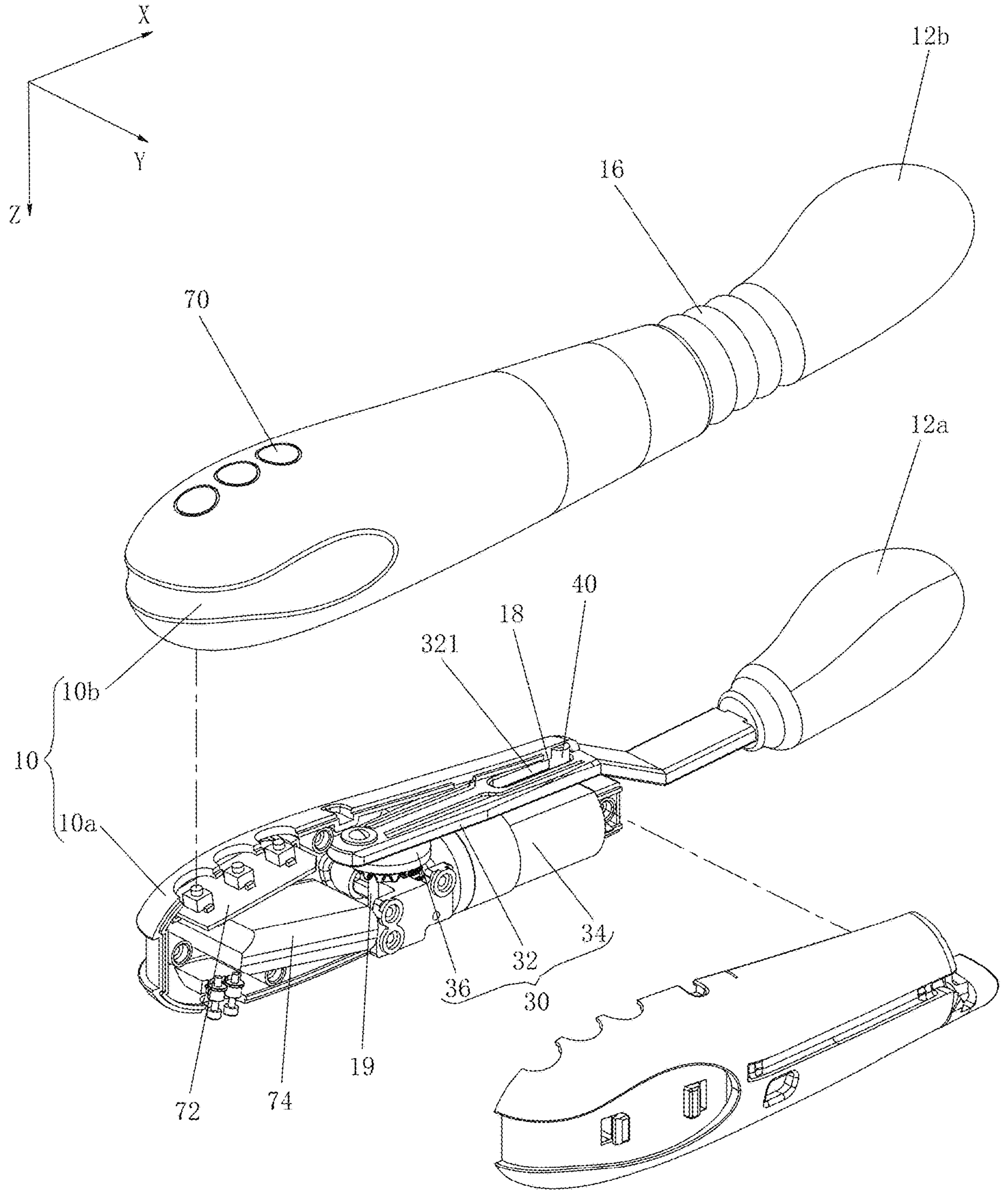
FIG. 4 a schematic, exploded view of the sexual stimulation device of FIG. 1.

In this embodiment, as shown in FIGS. 3-4, the shell 10 may be a double-layer structure, and includes an inner shell 10*a* and an outer shell 10*b* covering the inner shell 10*a*. The inner shell 10*a* is made of hard materials such as plastic, metal, etc., which has a relatively high strength and thus provides support for the components mounted inside the shell 10, such as the first driving unit 20, the second driving unit 30, and etc. The outer shell 10*b* is made of flexible materials such as silicone, rubber, and etc., and has a soft touch. In other embodiments, the outer shell 10*b* may be made of other flexible materials that can directly contact the skin, which is not limited in the present application.

As shown in FIG. 3, the massage portion 12 may be a double-layer structure, and includes a hard layer 12*a* and a soft layer 12*b* covering the hard layer 12*a*. The hard layer 12*a* may be part of the inner shell 10*a*, while the soft layers 12*b* may be part of the outer shell 10*b*. In this embodiment, the soft layer 12*b* of the massage portion 12 is integrally connected to the outer shell 10*b*, and wrinkles 16 are formed at a joint of the soft layer 12*b* and the outer shell 10*b*. The hard layer 12*a* of the massage portion 12 is disconnected from the inner shell 10*a* at a position corresponding to the wrinkles 16, making the massage portion 12 be easier to deform. The massage portion 12 thus may have a larger swing and/or movement amplitude, thereby having a larger stimulation range.

Preferably, after the inner shell 10*a* being assembled with the first driving unit 20, the second driving unit 30, etc., the outer shell 10*b* is integrally formed on the inner shell 10*a* through over-molding, achieving good sealing effect for the components inside the shell 10. The outer shell 10*b* plays a waterproof and dustproof role, facilitating the cleaning and storage of the sexual stimulation device 100.

The first driving unit 20 is set in the massage portion 12 for driving the massage portion 12 to move in a first manner. In an embodiment, as shown in FIGS. 3-4, the first driving unit 20 includes a first vibration motor. When the first driving unit 20 is activated, it drives the massage portion 12 to vibrate at a certain frequency, stimulating the human body, such as the vagina or the rectum through vibration. It should be understood that during use, the vibration frequency of the first driving unit 20 may be adjusted according to the user's needs.

The second driving unit 30 is connected to the massage portion 12 for driving the massage portion 12 to move in a second manner. The second driving unit 30 includes a swing arm 32 arranged in the shell 10. One end of the swing arm 32 is connected to the massage portion 12, thereby driving the massage portion 12 to do reciprocating motion. Specifically, the swing arm 32 is slidably connected to the shell 10 by a first shaft 40, allowing the massage portion 12 to do linear reciprocating motion relative to the shell 10. At the same time, the swing arm 32 is rotatably connected to the shell 10 by a second shaft 42, allowing the massage portion 12 to do reciprocating swinging relative to the shell 10. The linear reciprocating motion and reciprocating swinging of the massage portion 12 are superimposed, finally forming an annular trajectory, such as a circular trajectory, an elliptical trajectory and the like. Thus, the massage portion 12 is driven to knead the sensitive area of the human body, such as the vaginal wall of the woman, stimulating the crus of clitoris.

The end of the swing arm 32 is inserted into the hard layer 12*a* of the massage portion 12, and is fixedly connected to the hard layer 12*a* through snap-fitting, welding, bonding, interference fitting, and etc., so as to drive the entire massage portion 12 to move. The hard layer 12*a* can better transmit the force of the swing arm 32 to the massage portion 12, allowing the massage portion 12 to have a larger swing and/or movement range, thereby having a larger stimulation range. Preferably, the end of the swing arm 32 can be integrally fixed in the hard layer 12*a* during the process of forming the soft layer 12*b*, which not only simplifies production and assembly, but also enhances the connection strength between the massage portion 12 and the swing arm 32.

Figure 5:
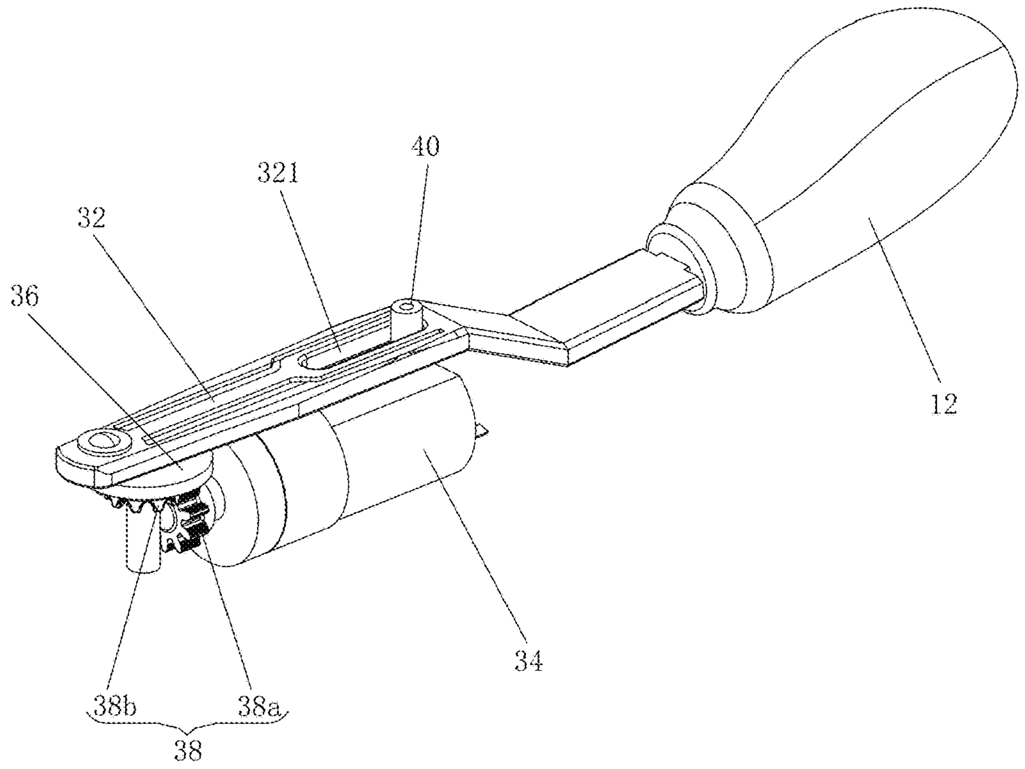
FIG. 5 is a schematic view of a massage portion and its driving unit of the sexual stimulation device.
Figure 6:
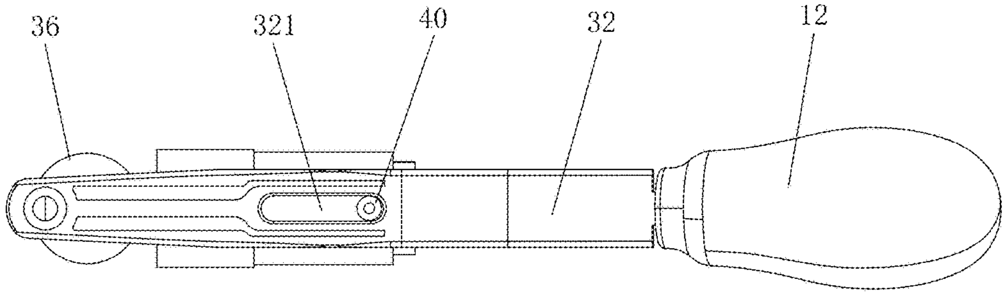
FIG. 6 is a top plan view of FIG. 5.
Figure 7:
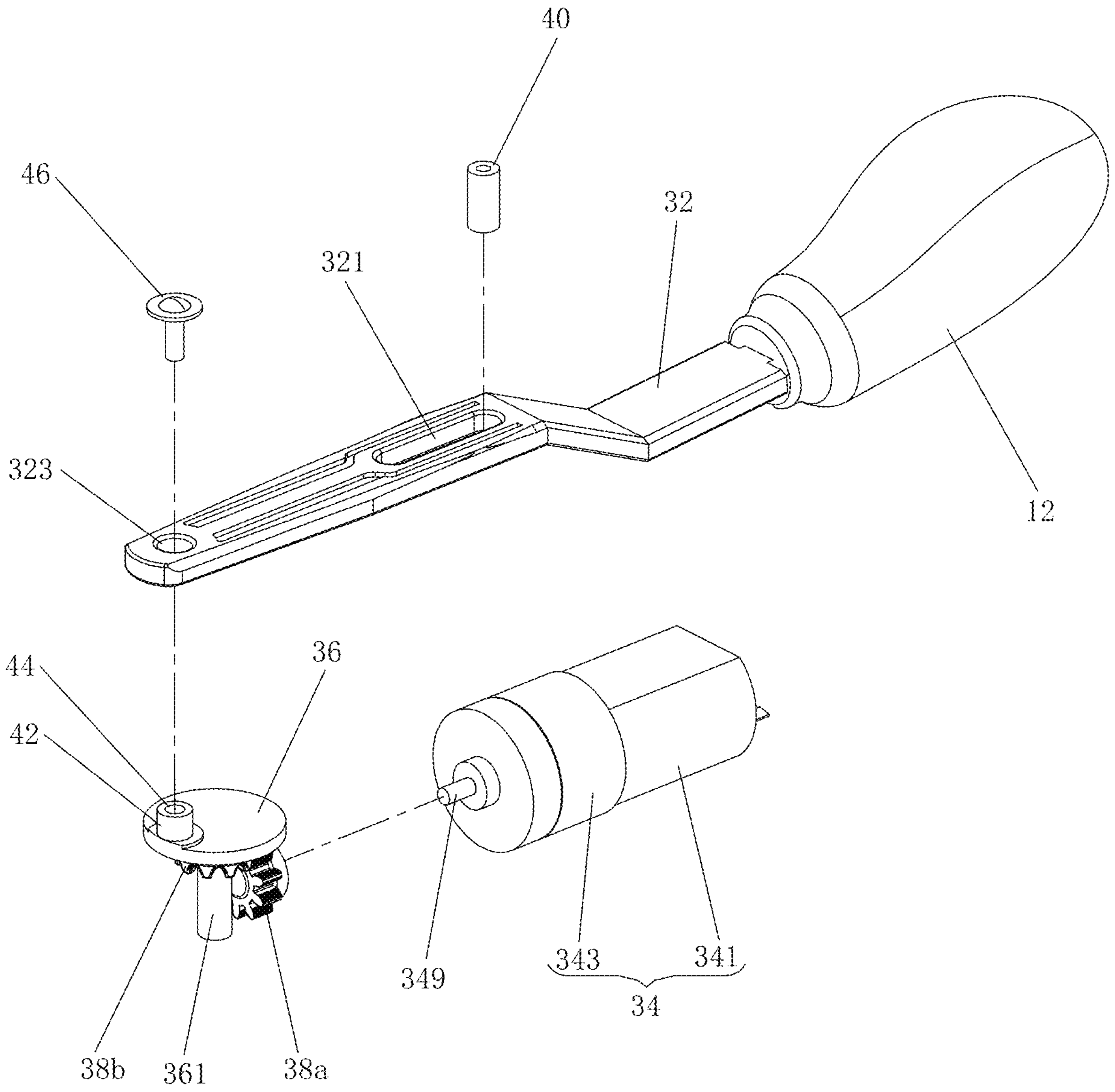
FIG. 7 is an exploded view of FIG. 5.

In an embodiment, as shown in FIGS. 5-7, the swing arm 32 is generally an elongated plate with a longitudinal direction thereof being consistent with the longitudinal direction of the shell 10, i.e., X-direction in the drawings. A middle portion of the swing arm 32 is slidably connected to the shell 10 through the first shaft 40, and another end of the swing arm 32 is pivotally connected to the shell 10 through the second shaft 42. The axial direction of the first shaft 40 and the second shaft 42 is basically consistent with a lateral direction of the shell 10, i.e., Z-direction in the drawings, and perpendicular to the swing arm 32. When the second shaft 42 is driven to rotate around an axis O in a longitudinal plane, such as the XY-plane, which is perpendicular to the Z-direction, due to the limitation of the first shaft 40, the rotational motion of the second shaft 42 is transformed into the linear reciprocating motion of the swing arm 32 in the X-direction and the reciprocating swinging in the XY-plane, finally driving the massage portion 12 connected to the swing arm 32 to move along a circular trajectory.

In an embodiment, the swing arm 32 is provided with a sliding groove 321 at a portion thereof adjacent to the massage portion 12. The sliding groove 321 is elongated and extends along the X-direction. The first shaft 40 is inserted into the sliding groove 321, with a diameter generally equivalent to a width of the sliding groove 321 but much smaller than a length of the sliding groove 321. Through the cooperation of the first shaft 40 and the sliding groove 321, the swing arm 32 can slide relative to the first shaft 40 along its length direction; and the swing arm 32 and the first shaft 40 are relatively fixed in the width direction of the swing arm 32. In the illustrated embodiment, the shell 10 is provided with a first support seat 18 at a position corresponding to the first shaft 40, and an end of the first shaft 40 extends beyond the sliding groove 321 and is inserted into the first support seat 18.

Figure 8:
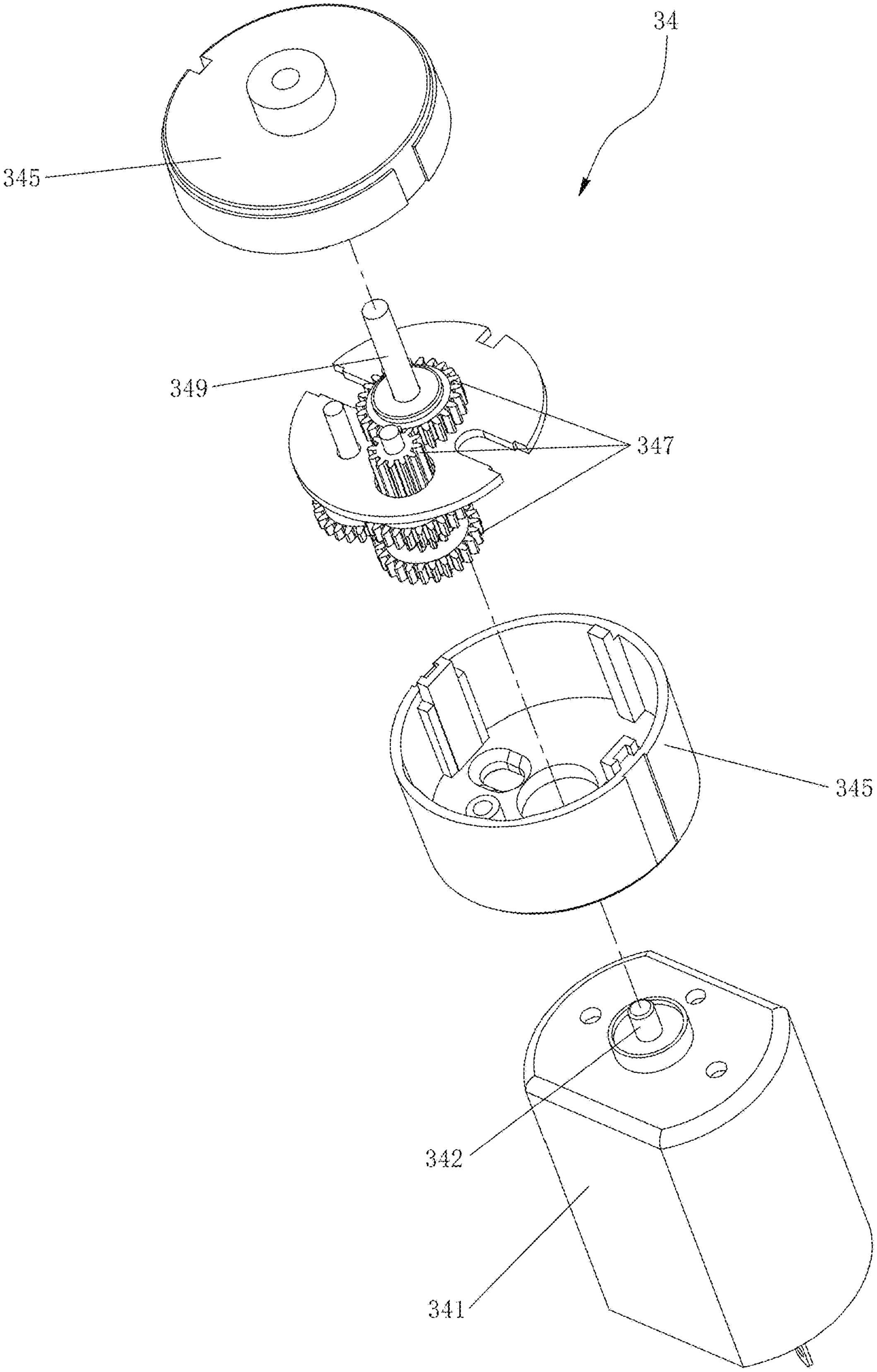
FIG. 8 is a further exploded view of a gearbox of the driving unit of FIG. 5.

In an embodiment, the second driving unit 30 further includes a gearbox 34 and a rotary member 36 connected to the gearbox 34 for power transmission. Referring to FIG. 8, the gearbox 34 includes a motor 341 and a gear unit 343. The motor 341 serves as a driving component of the sexual stimulation device 100 and has an output shaft 342 rotating at high-speed. The gear unit 343 includes a gear housing 345 and a plurality of gears 347 arranged in the gear housing 345. The gears 347 mesh with each other, and a reduction ratio of the whole gear unit 343 can be determined according to the gear ratios between the meshed gears 347. In an embodiment, the reduction ratio of the gear unit 343 is not less than 4:1 and not more than 100:1, and an output speed of the gearbox 34 is not exceed 1000 rpm. That is, a speed of an output shaft 349 of the gearbox 34 does not exceed 1000 rpm.

The rotary member 36 is connected to the output shaft 349 of the gearbox 34 in a transmission way. Under the driving of the gearbox 34, the rotary member 36 rotates about the axis O, wherein the axis O may be a central axis of the rotary member 36. Preferably, a speed of the rotary member 36 does not exceed 1000 rpm. The shell 10 is provided with a second support seat 19 at a position corresponding to the rotary member 36, and a rotating shaft 361 extends outwardly from the rotary member 36 into the second support seat 19. Preferably, the rotating shaft 361 is rotatably inserted into the second support seat 19. The second shaft 42 is eccentrically arranged on the rotary member 36, and rotates around the axis O under the driving of the gearbox 34.

In an embodiment, the second shaft 42 and the rotary member 36 may be integrally formed as one piece. The another end of the swing arm 32, which is away from the massage portion 12, is provided with a shaft hole 323, and the second shaft 42 may be rotatably inserted into the shaft hole 323. Preferably, a fixing hole 44 is provided in the second shaft 42, and a rod portion of a fixing member 46, such as pins, rivets, screws, etc., is inserted into the fixing hole 44 of the second shaft 42, and a head portion of the fixing member 46 abuts against the swing arm 32 at a periphery of the shaft hole 323, so as to fix the second shaft 42 and the swing arm 32 in the Z-direction. In this way, the second shaft 42 will not automatically detach from the shaft hole 323 of the swing arm 32, ensuring the connection stability between the swing arm 32 and the rotary member 36.

In some embodiments, the second shaft 42 may be integrally formed on the swing arm 32, and a shaft hole 323 may be formed on the rotary member 36 corresponding to the second shaft 42. Alternatively, the second shaft 42 may be formed separately and then pivotally connected to the swing arm 32 and/or the rotary member 36.

When the gearbox 34 is started, the output shaft 342 of the motor 341 rotates at high speed. After being slowed down by the gear unit 343, the rotary member 36 rotates at an appropriate speed, such as no more than 1000 rpm. The second shaft 42 rotates around the axis O, driving the swing arm 32 to rotate. The swing arm 32 generates displacement in both its length and width directions. Due to the engagement between the first shaft 40 and the sliding groove 321, the movement of the swing arm 32 in its length direction is not restricted, allowing the swing arm 32 to slide along its sliding groove 321 relative to the first shaft 40; and the movement of the swing arm 32 in its width direction is limited by the first shaft 40, causing the swing arm 32 to rotate relative to the second shaft 42 and thus generate swing.

Figure 9:
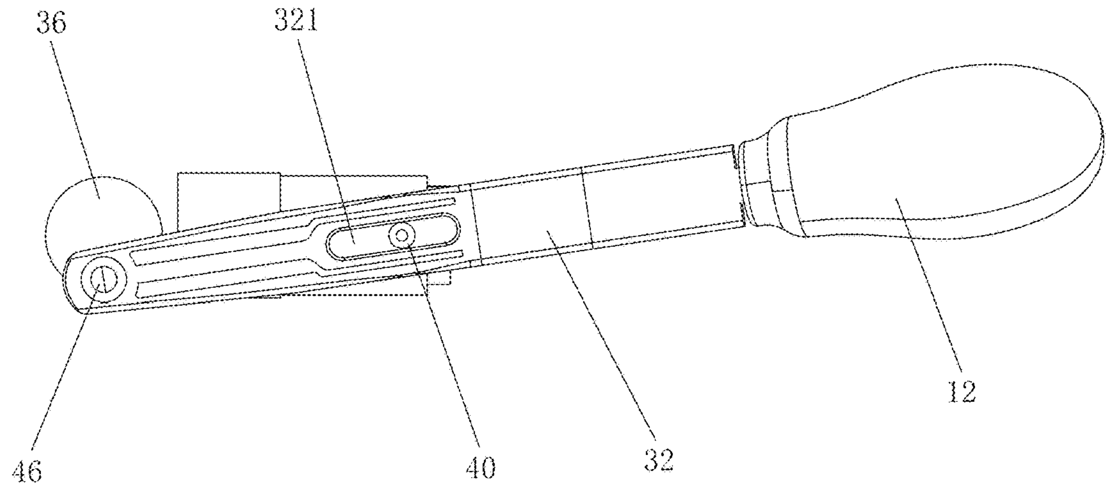
FIG. 9 is a schematic view of a first intermediate state of the massage portion.
Figure 10:
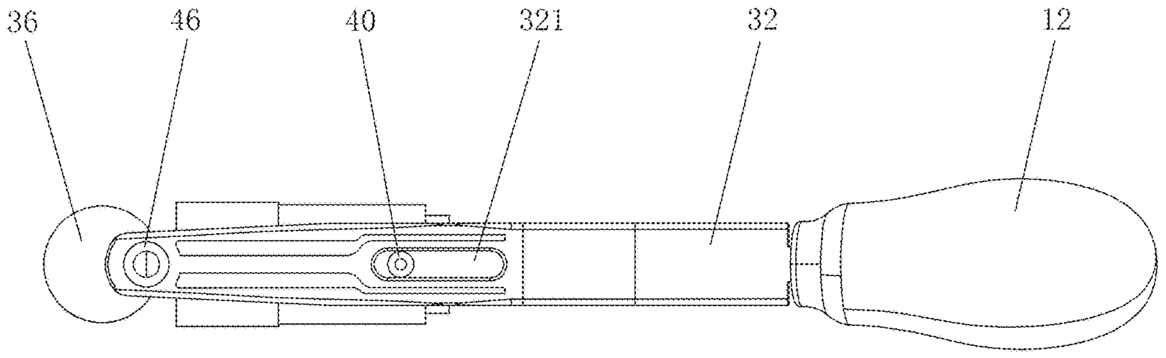
FIG. 10 is a schematic view of a second intermediate state of the massage portion.
Figure 11:
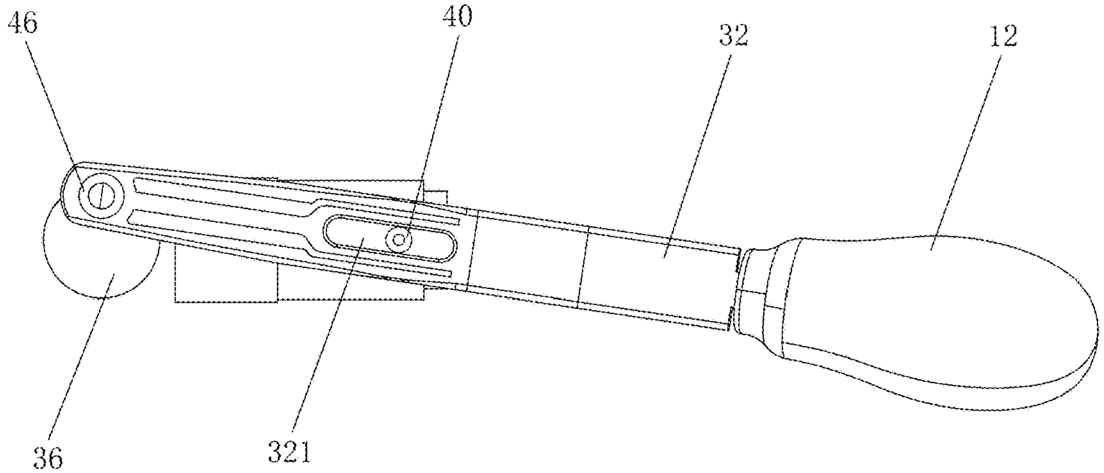
FIG. 11 is a schematic view of a third intermediate state of the massage portion.
Figure 12:
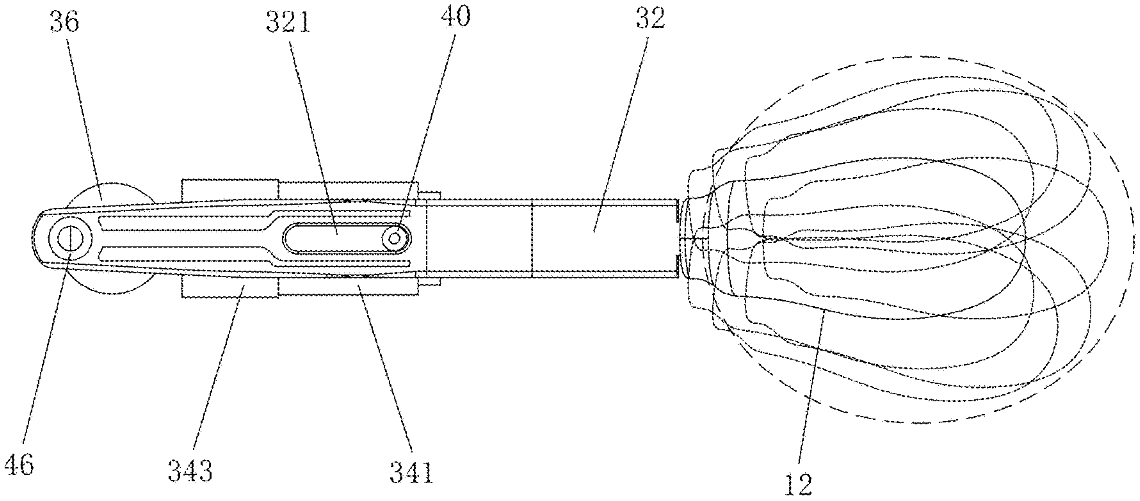
FIG. 12 is a schematic view of trajectory of the massage portion.

As shown in FIGS. 9-11, as the rotation angle of the second shaft 42 around the axis O changes, the swinging center of the swing arm 32 continuously changes. The swing arm 32 simultaneously generates two different reciprocating movements, namely the linear reciprocating movement of the swing arm 32 in the X-direction and the reciprocating swing of the swing arm 32 in the XY-plane. The combination of these two reciprocating movements drives the massage portion 12 connected to the swing arm 32 to move along a circular or elliptical trajectory in the XY-plane, as shown by the dashed line in FIG. 12.

Preferably, the length of the swing arm 32 in the X-direction is not less than 2 centimeters, allowing the swing arm 32 and the massage portion 12 connected to the swing arm 32 to have a larger moving range, thereby an area of the human body kneaded by the massage portion 12 being enlarged and accordingly a stimulation effect being better. In an embodiment, the trajectory of the massage portion 12 is substantially an elliptical trajectory with a major axis not less than 1 centimeter. In another embodiment, the trajectory of the massage portion 12 is substantially a circular trajectory with a diameter not less than 1 centimeter. In the illustrated embodiment, the swing arm 32 in whole is elongated in the X-direction, and its middle portion is bent to facilitate the arrangement of the gearbox 34. In some embodiments, the swing arm 32 may be an elongated, flat structure.

Compared to the existing sexual stimulation devices which stimulate the human body by linear reciprocating motion, the massage portion 12 of the present sexual stimulation device moves along an annular trajectory, and thus kneads the sensitive area, such as the vagina or the rectum of the human body. An area of the human body kneaded by the massage portion 12 is enlarged and accordingly a stimulation effect is better. Moreover, the massage portion 12 kneads the human body, which is similar to the motion of the hand, providing a more comfortable sexual experience.

In an embodiment, as shown in FIGS. 5-6, a steering unit 38 is provided between the rotary member 36 and the gearbox 34. By means of the steering unit 38, the direction of power transmission may be changed, facilitating the arrangement of the gearbox 34. In the illustrated embodiment, the gearbox 34 is arranged with its output shaft 349 being generally parallel to the swing arm 32. The steering unit 38 is located at an axial end of the gearbox 34 and the swing arm 32. In this way, a space below the swing arm 32 may be utilized to set the gearbox 34, which is conducive to the miniaturization of the device.

Specifically, the steering unit 38 is a steering gear unit, and includes a plurality of gears that mesh with each other, such as a first gear **38*a*, a second gear 38*b*, and etc. The first gear 38*a* is mounted around the output shaft 349 of the gearbox 34, preferably the first gear 38*a* and the gearbox 34 are arranged coaxially. The second gear 38*b* is mounted around the rotating shaft 361 of the rotary member 36, preferably the second gear 38*b* and the rotary member 36 are integrally formed as on piece. The first gear 38*a* and the second gear 38*b* may be bevel gears and mesh with each other, achieving a change of 90 degrees in the direction of power transmission between the gearbox 34 and the rotary member 36**.

In other embodiments, the direction of power transmission can be determined based on the internal space of the sexual stimulation device 100, and the angle that needs to be changed is not limited to 90 degrees. Users can choose corresponding type of steering unit according to their needs to achieve direction change, which should not be limited by specific embodiments. In some embodiments, the steering unit 38 may also be integrated inside the gearbox 32, thereby a separate steering unit is no longer needed. Alternatively, in some embodiments, there is no need for direction change between the gearbox 34 and the rotary member 36, and thus the steering unit 38 may be omitted.

In an embodiment, the handle 14 of the shell 10 is provided with buttons 70 thereon, which may be touch type buttons and/or mechanical buttons. A control circuit board 72 is provided in the handle 14, and forms a control circuit with the gearbox 34, the vibration motor, and etc. The user can control the operation of the sexual stimulation device 100 through the buttons 70, including controlling the speed and direction of the gearbox 34, the vibration frequency of the vibration motor, and etc. A battery 74, preferably a rechargeable battery, is provided inside the shell 10. The battery 74 is connected to the control circuit board 72 electrically and serves as a power source of the sexual stimulation device 100.

During use of the sexual stimulation device 100, the user may activate the first driving unit 20 to achieve a stimulation effect to the vagina/rectum through the high-frequency vibration of the massage portion 12; or, the user may activate the gearbox 34 of the second driving unit 30 to achieve a kneading effect to the vagina/rectum through the movement of the massage portion 12; or, the user may simultaneously activate the first driving unit 20 and the second driving unit 30, to experience a multi-stimulation effect, which is convenient in use.

In this application, the sexual stimulation device has two different driving units for driving the massage portion to move in different manners, wherein the massage portion forms an annular trajectory under the driving of the second driving unit, creating a kneading effect on the user's sensitive area, such as the vagina, the clitoris, the rectum, the prostate, and etc.; and the vibration motor can create a high-frequency vibration effect on the sensitive area. A combination of these stimulation makes the sexual organs, such as the clitoris or the prostate, more excited, so that the users are more likely to reach orgasm with the help of the present sexual stimulation device 100, resulting in better sexual life and better sexual experience. It should be understood that, based on the sexual organs to be stimulated, the shell, particularly the massage portions, may have different sizes and/or shapes.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A sexual stimulation device, comprising:

a shell comprising a massage portion formed at one end thereof, the massage portion being configured to be inserted into a rectum or a vagina of a human body, an outer surface of the massage portion serving as a massage surface of the sexual stimulation device for contacting a rectum wall or a vaginal wall of the human body;

a first driving unit comprising a vibration motor arranged in the massage portion; and a second driving unit comprising a gearbox and a swing arm driven by the gearbox, one end of the swing arm being connected to the massage portion, under the driving of the second driving unit, the massage portion moving along an annular trajectory configured to make the massage surface form a kneading effect on the rectum wall or the vaginal wall;

wherein the swing arm is provided with a sliding groove, and a first shaft is provided with one end thereof being fixedly connected to the shell and another end thereof being slidably inserted into the sliding groove;

wherein a portion of the swing arm configured with the sliding groove is arranged at a lateral side of the gearbox and adjacent to the gearbox; and wherein the sliding groove is elongated in a direction parallel to a rotary axis of the gearbox, and the first shaft is perpendicular to the rotary axis of the gearbox.

2. The sexual stimulation device according to claim 1, wherein the massage portion comprises a hard layer and a soft layer covering the hard layer, the hard layer is fixed inside the soft layer, the vibration motor is fixed inside the hard layer, and the one end of the swing arm is fixedly inserted into the hard layer.

3. The sexual stimulation device according to claim 2, wherein the shell comprises an inner shell and an outer shell covering the inner shell, the soft layer and the outer shell are integrally connected and wrinkles are formed at a joint of the soft layer and the outer shell, and the hard layer and the inner shell are disconnected at a position corresponding to the wrinkles; and wherein the hard layer, the soft layer on the hard layer, and the vibration motor in the hard layer move together under the driving of the swing arm.

4. The sexual stimulation device according to claim 1, wherein the gearbox comprises a motor and a gear unit connected to the motor, and an output speed of the gearbox does not exceed 1000 rpm.

5. The sexual stimulation device according to claim 1, wherein the swing arm is elongated and a length of the swing arm is not less than 2 cm.

6. The sexual stimulation device according to claim 5, wherein the trajectory of the massage portion is an elliptical trajectory, and the major axis of the elliptical trajectory is not less than 1 centimeter; or, the trajectory of the massage portion is a circular trajectory, and the diameter of the circular trajectory is not less than 1 centimeter.

7. The sexual stimulation device according to claim 1, wherein the second driving unit further comprises a rotary member connected to the gearbox in a transmission way, and another end of the swing arm is pivotally connected to the rotating member through a second shaft, and the second shaft is eccentrically set on the rotating member.

8. The sexual stimulation device according to claim 7, wherein a steering unit is connected between the rotary member and the gearbox, and the second shaft is arranged at an angle with an output shaft of the gearbox.

9. The sexual stimulation device according to claim 8, wherein the steering unit comprises a plurality of gears that mesh with each other, one of the plurality of gears is connected to an output shaft of the gearbox, another one of the plurality of gears is connected to the rotary member.

10. The sexual stimulation device according to claim 9, wherein the another one of the plurality of gears is integrally formed and co-axial with the rotary member.

11. The sexual stimulation device according to claim 7, wherein a distance between the second shaft and the sliding groove is larger than a length of the sliding groove.

12. The sexual stimulation device according to claim 7, wherein the rotary member and the massage portion are arranged at two opposite axial end sides of the gearbox, respectively.

13. The sexual stimulation device according to claim 1, wherein the shell is elongated and substantially rod-shaped, and the massage portion moves along the annular trajectory in a longitudinal plane of the shell.

14. The sexual stimulation device according to claim 1, wherein the one end of the swing arm connected to the massage portion is arranged at an axial end side of the gearbox.

15. The sexual stimulation device according to claim 14, wherein a transition portion is provided between the one end of the swing arm connected to the massage portion and the portion of the swing arm configured with the sliding groove, and wherein the transition portion is inclined relative to an axial direction of the first shaft.

16. A sexual stimulation device, comprising:

a shell comprising a massage portion formed at one end thereof, the massage portion being configured to be inserted into a rectum or a vagina of a human body, an outer surface of the massage portion serving as a massage surface of the sexual stimulation device for contacting a rectum wall or a vaginal wall of the human body;

a first driving unit comprising a vibration motor arranged in the massage portion; and a second driving unit comprising a gearbox and a swing arm driven by the gearbox, one end of the swing arm being connected to the massage portion, under the driving of the second driving unit, the massage portion moving along an annular trajectory configured to make the massage surface form a kneading effect on the rectum wall or the vaginal wall;

wherein the swing arm is provided with a sliding groove, and a first shaft is provided with one end thereof being fixedly connected to the shell and another end thereof being slidably inserted into the sliding groove;

wherein the second driving unit further comprises a rotary member connected to the gearbox in a transmission way, and another end of the swing arm is pivotally connected to the rotating member through a second shaft, and the second shaft is eccentrically set on the rotating member; and wherein the rotary member and the massage portion are arranged at two opposite axial end sides of the gearbox, respectively.

17. A sexual stimulation device, comprising:

a shell comprising a massage portion formed at one end thereof, the massage portion being configured to be inserted into a rectum or a vagina of a human body, an outer surface of the massage portion serving as a massage surface of the sexual stimulation device for contacting a rectum wall or a vaginal wall of the human body;

a first driving unit comprising a vibration motor arranged in the massage portion; and a second driving unit comprising a gearbox and a swing arm driven by the gearbox, one end of the swing arm being connected to the massage portion, under the driving of the second driving unit, the massage portion moving along an annular trajectory configured to make the massage surface form a kneading effect on the rectum wall or the vaginal wall;

wherein the swing arm is provided with a sliding groove, and a first shaft is provided with one end thereof being fixedly connected to the shell and another end thereof being slidably inserted into the sliding groove;

wherein a portion of the swing arm configured with the sliding groove is arranged at a lateral side of the gearbox and adjacent to the gearbox; and wherein the one end of the swing arm connected to the massage portion is arranged at an axial end side of the gearbox.

18. The sexual stimulation device according to claim 17, wherein a transition portion is provided between the one end of the swing arm connected to the massage portion and the portion of the swing arm configured with the sliding groove, and wherein the transition portion is inclined relative to an axial direction of the first shaft.

* * * * *